United States Patent [19]

Ault

[11] Patent Number: 4,614,879
[45] Date of Patent: Sep. 30, 1986

[54] PULSED MOTOR STARTER FOR USE WITH A PHOTOVOLTAIC PANEL

[75] Inventor: John C. Ault, Gainesville, Fla.
[73] Assignee: Pulstar Corporation, Fla.
[21] Appl. No.: 645,628
[22] Filed: Aug. 30, 1984
[51] Int. Cl.$^4$ ............................................... H02J 1/00
[52] U.S. Cl. .................................. 307/130; 323/299; 323/906; 136/291; 136/293
[58] Field of Search ........................ 307/44–46, 307/52, 130; 323/299, 906; 136/291, 293; 126/417, 419

[56] References Cited

U.S. PATENT DOCUMENTS 4,100,427  7/1978  Durand et al. ............... 307/130 X
4,483,319  11/1984  Dinh ............................ 126/419 X
4,510,434  4/1985  Assbeck et al. ............... 323/906 X Primary Examiner—A. D. Pellinen
Assistant Examiner—Derek S. Jennings
Attorney, Agent, or Firm—Schwartz, Jeffery, Schwaab, Mack, Blumenthal & Evans

[57] ABSTRACT

A photovoltaic panel for converting solar energy into electrical energy output having a voltage and a current and a load requiring a starting current which is higher than a minimum running current. The output of the photovoltaic panel is detected by a sensor and circuitry is reponsive to the sensor for applying the output to the load in pulses at a frequency which varies inversely with the maximum available power from the panel.

14 Claims, 7 Drawing Figures

PULSED MOTOR STARTER FOR USE WITH A PHOTOVOLTAIC PANEL

BACKGROUND OF THE INVENTION

1. Field of the Invention

This invention relates to systems for converting solar energy into electrical energy, and more particularly, to such systems which incorporate a load requiring a high initial starting current.

2. Discussion of Related Art

The use of solar energy as a power source is becoming increasingly more popular, especially in areas that have a relatively constant level of high intensity solar radiation available. One popular use of solar energy is in the production of domestic hot water. Domestic hot water systems utilize a heat exchange liquid, such as water, which is circulated between a storage tank and a solar collector panel by use of a pump which is normally started and stopped in response to the level of solar insolation. It is also known to isolate the pump electrical supply from municipal power supply grids by using photovoltaics in order to eliminate the fear of a reduction in efficiency by parasitic power consumption. One example of a circulation pump operated by photovoltaics is disclosed in U.S. Pat. No. 4,147,157 to Zakhariya.

While the use of photovoltaics to operate a domestic hot water circulation pump is attractive from the point of view that the sun controls the system operation without reliance on an outside electrical source, serious drawbacks of such systems do exist. If the photovoltaic panel is installed with the same orientation as the thermal collector, the panel may take up to 90 minutes to produce a sufficient charge to start the circulation pump. On the other hand, in the evening the photovoltaic panel may cause the circulation pump to operate too long. One solution to the problem of late circulation is to orient the photovoltaic array 20° to the east relative to the thermal collector. However, an oversized photovoltaic panel must be used resulting in higher cost. Furthermore, some systems using larger photovoltaic panels are still plaqued with late starts and stops.

Many electrical power supplies have been suggested using solar energy.

For example, U.S. patent application Ser. No. 485,502 to Dinh discloses a circuit for starting a pump motor which includes a capacitor disposed between the photovoltaic panel and the pump. The pump is isolated from the capacitor until the voltage on the capacitor reaches a level sufficient to start the pump motor.

U.S. Pat. No. 4,100,427 to Durand et al. shows a device for converting solar energy into electrical energy. In the Durand system, a plurality of electrical accumulators in the form of batteries are connected to a plurality of photocells.

U.S. Pat. No. 4,122,396 to Grazier et al. shows a stable solar power source which includes a capacitive means having a large capacitance connected in parallel with a plurality of interconnected solar cells in order to offset fluctuations in current supplied by the solar cells.

U.S. Pat. No. 2,889,490 to Paradise shows a solar powered light source which produces visible flashes of light in the daytime or nighttime. The system includes an elementary relaxation oscillator comprising a resistor, a capacitor, and an inert gas-filled flash tube. The relaxation oscillator is fed from a parallel combination of a solar cell and a battery.

U.S. Pat. No. 3,317,809 to Bowers et al. shows a self-contained electrical lighting unit which includes a first bank of solar cells connected to recharge a battery, and a second bank of solar cells which actuates a relay. The relay is operated to complete a circuit connecting the battery to the first bank of solar cells or connecting the battery to a light.

U.S. Pat. No. 3,980,996 to Greenspan et al. shows a self-sustaining alarm transmitter device which includes a storage element connected to energize an output transmitting circuit on the ocurrence of an alarm condition to maintain the storage element at full charge. A trickle charging circuit is provided which includes an energy conversion device for converting solar energy, electromagnetic energy, heat energy or the like into an electrical current.

U.S. Pat. No. 4,375,662 to Baker discloses a method and apparatus for enabling output power of a solar panel to be maximized. The D.C. power supplied by a photovoltaic panel to a load is controlled by monitoring the slope of the panel voltage versus current characteristic and adjusting the current supplied by the panel to the load so the slope is approximately unity.

SUMMARY OF THE INVENTION

One object of the present invention is to provide a circuit for converting solar energy into electrical energy which can be used to power a circulation pump in a solar heating system so that the system can be operated free of any outside electrical power sources.

A further object of the present invention is to provide a circuit for converting solar energy into electrical energy for a load requiring a high starting current by initially supplying the load with a plurality of low-voltage, high-frequency pulses.

An additional object of the present invention is to provide a circuit for converting solar energy into electrical energy which circuit can be adjusted to provide different starting levels.

A still further object of the present invention is to provide a circuit for converting solar energy into electrical energy to operate a pump motor wherein the pump motor is stopped during periods of low insolation.

In accordance with the above and other objects, the present invention is a circuit for converting solar energy into electricity for starting and running a load which requires a starting current that is higher than a minimum running current. The circuit includes a photovoltaic panel for converting solar energy into an electrical energy output. A sensor detects the output of the photovoltaic panel and circuitry is provided which is responsive to the sensor for applying the output of the photovoltaic panel to the load in pulses at a frequency which varies inversely with the maximum power available from the photovoltaic panel.

The sensor may comprise a resistance which is higher than the load. The higher resistance is applied to the photovoltaic panel to cause the output to be in a high voltage range. A control circuit compares the voltage output of the photovoltaic panel to a predetermined voltage level and applies substantially all of the voltage from the panel across the load when the panel voltage is above the predetermined level.

The resistance may be connected in series with the load and the control means may comprise a comparator connected to receive the voltage from the panel and to receive the predetermined voltage level. The control circuit also includes a semi-conductor switching device connected to an output of the comparator. The semi-conductor switching device is connected to selectively short the resistor.

The semi-conductor switching device is operative at a rate in excess of 1 kHz, and preferably in excess of 100 kHz.

In accordance with other aspects, the present invention is a circuit for starting and operating a load using power derived exclusively from a photovoltaic panel. The circuit includes a first load to be operated, a second load, and a photovoltaic panel having a power output curve wherein the panel produces a high voltage, low current output under high load conditions and produces a low voltage, high current output under low load conditions, and wherein the total power available from the panel increases with an increase of solar insolation. Circuitry is provided for detecting an output parameter of the panel to determine a shift in the panel output in a first direction along the curve and effecting a change in the load on the panel between the first load and the second load in response to detecting the shift in a first direction to cause a shift in an opposite direction along the curve, thereby producing pulses of power through the load to be operated.

The present invention also includes the method of starting and operating a load using power derived exclusively from a photovoltaic panel having a power output curve demonstrating a high voltage, low current output under high load conditions and a low voltage, high current output under low load conditions, and wherein the total power available from the panel increases with an increase of solar insolation. The method comprises detecting an output parameter of the panel to determine a shift in the panel output in a first direction along the curve and effecting a change in the load on the panel between a first load and a second load in response to detecting the first direction shift to cause a shift in an opposite direction along the curve to produce pulses of power through the load.

BRIEF DESCRIPTION OF THE DRAWINGS

The above and other objects of the present invention will become more readily apparent as the invention is more clearly described in the detailed description to follow, reference being had to the accompanying drawings in which like reference numerals represent like parts throughout, and in which.

DETAILED DESCRIPTION OF THE PREFFERRED EMBODIMENT

Figure 1:
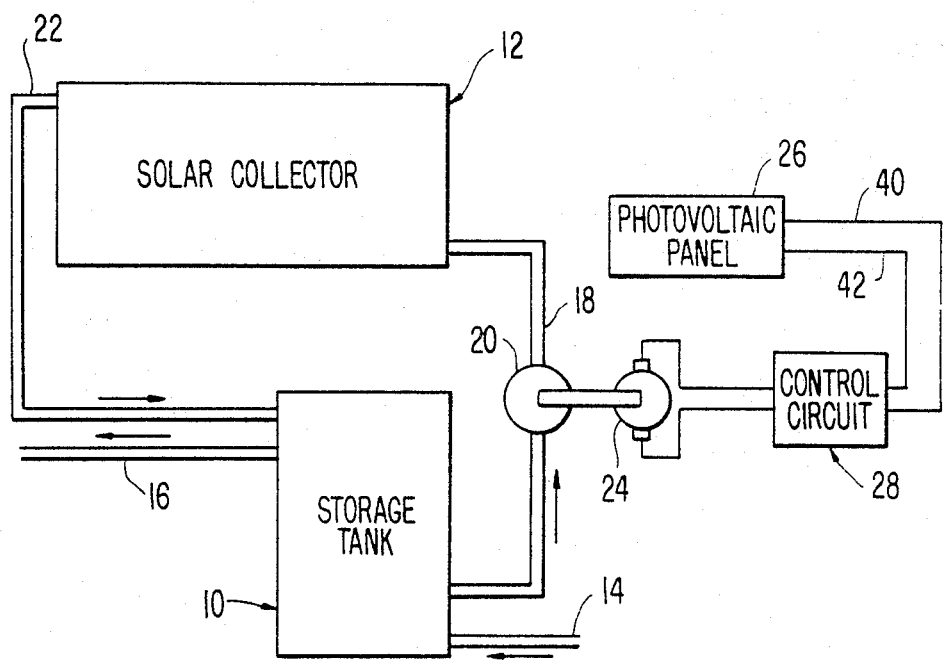
FIG. 1 is a block diagram showing a domestic hot water heating system incorporating the present invention.

FIG. 1 shows a domestic hot water heating system having a hot water storage tank 10 for storing heated water, and a solar collector 12 through which water to be heated is passed. Storage tank 10 receives water to be heated through inlet pipe 14 and heated hot water is drawn off through outlet pipe 16. Water is circulated through pipe 18 to solar collector 12 by pump 20. The water in solar collector 12 is heated and returned to tank 10 through pipe 22.

Pump 20 is driven by a motor 24. The sole source of power for motor 24 is a photovoltaic panel 26. The energy from panel 26 is passed through starting and control circuit 28 to motor 24.

Motor 24 is preferably a D.C. motor which can be operated directly by current from photovoltaic panel 26. As is conventional with all D.C. motors, the current required to initially start the motor is substantially greater than the current required to keep the motor running. This is due to the fact that the voltage across the motor terminals is a function of the input voltage minus the voltage produced by the motor back E.M.F. When the motor is idle, there is no back E.M.F. generated and the voltage seen by the motor is relatively high. Thus, a relatively large amount of current is drawn. Once the motor begins running, the amount of current required is reduced.

Photovoltaic panel 26 may be a Pulstar SX series module manufactured by Solarex Corporation. These panels are available from Pulstar Corporation of Gainesville, Fla. They comprise a plurality of conventional photovoltaic cells and each panel has a peak power of approximately 17.8 watts, a voltage at peak power of approximately 13.7 volts, and a current at peak power of approximately 1.3 amps.

Conventionally, a photovoltaic panel 26 would be connected directly to a motor 24 to operate pump 20. However, such a configuration is inadequate for purposes of starting the motor at the earliest opportune moment based on the amount of solar insolation available. Due to the high current requirements for starting motor 24, insolation of panel 26 would have to reach a relatively high level before sufficient current would be produced.

Figure 3:
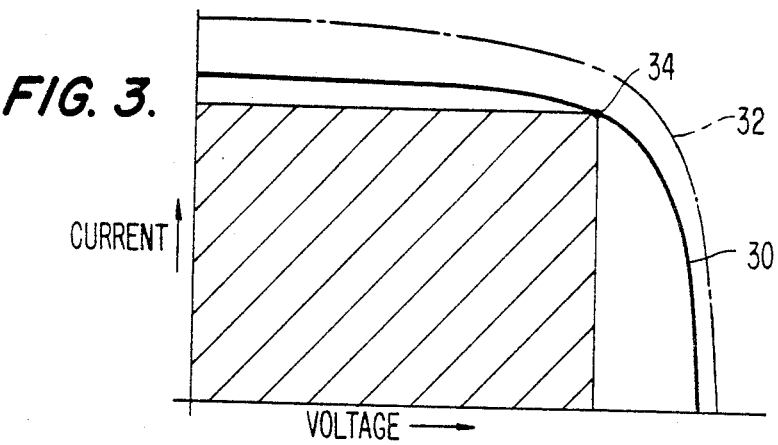
FIG. 3 is a graph showing the power curve of a typical photovoltaic panel wherein the abscissa represents voltage and the ordinate represents current.

As is well known, a photovoltaic panel has a power curve as shown in FIG. 3 at 30. In FIG. 3, the ordinate is current and the abscissa is voltage. Curve 30 is the power curve at a set level of solar insolation. Each panel has a family of curves similar to curve 30 with each of the curves being associated with a different level of solar insolation. For example, the power curve for a slightly higher level of solar insolation is shown in phantom at 32. As can be seen, the operating point of the photovoltaic panel on curve 30 defines the power level produced by the solar panel and depends not only on the amount of insolation but also on the load applied to the panel. Thus, it can be seen that the operating characteristics of photovoltaic panels vary according to their state of illumination, as well as the load on the panel. For example, in the lower two-thirds of their operating voltage range, photovoltaic panels respond much like constant current sources, especially at high illumination. At higher operating ranges, the current draw changes less radically thus making the panel seem like a constant voltage source. The most efficient operating point is the point which will yield the largest area under the power curve 30. This point is shown at 34 in FIG. 3 for the power curve 30.

Figure 2:
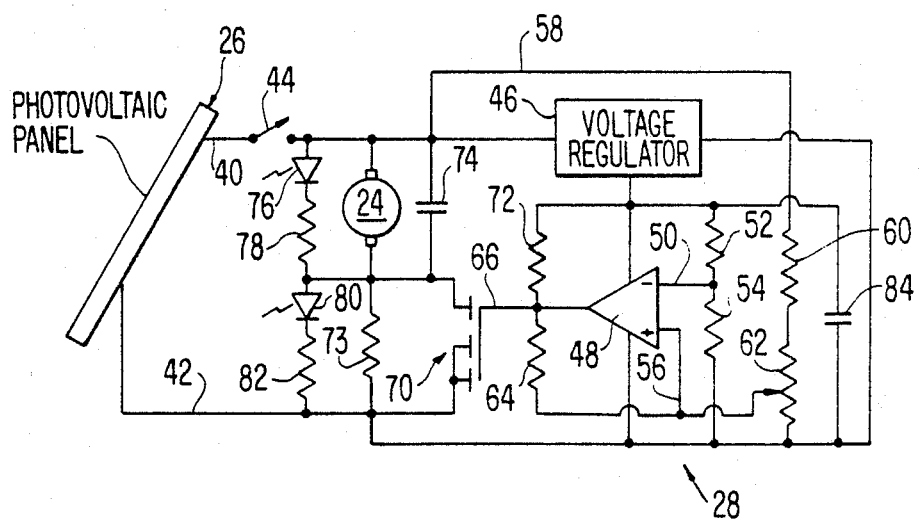
FIG. 2 is a circuit diagram showing the present invention.

FIG. 2 shows the photovoltaic panel 26, motor 24, and the circuit 28 for applying energy from panel 26 to motor 24. Circuit 28 is connected to electrical lines 40 and 42 from panel 26. The circuit includes a manual ON/OFF switch 44 which, when closed, provides current to a three terminal voltage regulator 46. Voltage regulator 46 may be a Motorola Model MC7805CT integrated circuit. Regulator 46 provides a constant bias voltage to a comparator 48 which may be a LM393 integrated circuit. Comparator 48 receives a reference voltage through line 50 on its inverting input. The reference voltage is generated by a voltage divider comprising resistors 52 and 54. This reference voltage would typically be set to approximately 2.5 volts. The non-inverting input receives a signal through line 56 which is indicative of the voltage output of panel 26. This signal is generated by the output of panel 26 through line 58 and a voltage divider comprising resistor 60 and a potentiometer 62. A feedback resistor 64 is also included to produce positive feedback to provide hysteresis, if needed.

The output of comparator 48 is passed through line 66 to the gate of MOSFET transistor 70. A resistor 72 is connected between the voltage supply 46 and the gate of transistor 66 to provide a bias voltage.

A load resistor 73 is connected in series with motor 24. Transistor 70 is connected in series with motor 24 and in parallel with resistor 73 so that the drain and source of the transistor are connected on opposite sides of resistor 72. The value of resistor 73 is relatively high in comparison with motor 24. A capacitor 74 is connected in parallel with motor 24 to reduce noise generated by the motor. A series combination of a LED 76 and resistor 78 is connected in parallel with motor 24 and a series combination of LED 80 and resistor 82 is connected in parallel with resistor 73 and transistor 70. Finally, a capacitor 84 is connected in parallel with the voltage divider comprising resistors 52 and 54.

In operation, with manual switch 44 closed, the output of panel 26 provides current to voltage regulator 46 upon the occurrence of solar insolation. Regulator 46 provides bias voltage to comparator 48 and transistor 70. When the solar insolation is extremely low, the voltage output of panel 26 is not sufficient to reach the reference level set by resistors 52 and 54. Thus, the current from panel 26 passes through motor 24 and resistor 72. This combination provides a high load to the panel. With reference to FIG. 3, it will be understood that a high load causes the panel to operate with a high voltage and relatively low current output on the essentially vertical portion of the power curve. The low current is not sufficient to start motor 24. Of course, the power curve on which the panel is operating has a relatively low maximum power output due to the low level of solar insolation. Once the voltage output of panel 26 reaches the reference level due to an increase in insolation, comparator 48 produces an output which turns on transistor 70. The impedance of transistor 70 becomes extremely low and essentially shorts out resistor 72. This causes substantially the entire voltage of panel 26 to be applied across the windings of motor 24. However, since the impedance of motor 24 is low, the operating point of panel 26 moves along its power curve toward the ordinate axis shown in FIG. 3 past the maximum power point. Therefore, the current is increased to a maximum and the voltage decreases. Once the voltage of the panel is reduced below the reference voltage, comparator 48 turns off transistor 70 thereby placing resistor 72 in the load circuit once again. This causes the operating point to ride back up along the load curve to the high voltage point. This operation essentially causes a pulse of current to be delivered to motor 24. The motor responds to this pulse by "ringing" which causes the current to reach a peak. The peak current operates to produce a small rotation of the motor. Each pulse in sequence causes continued rotation until the motor back EMF is built up to the point where rotation of the motor can be sustained. The back EMF produced by the motor causes the solar panel to operate near its maximum power point.

Figure 4A:
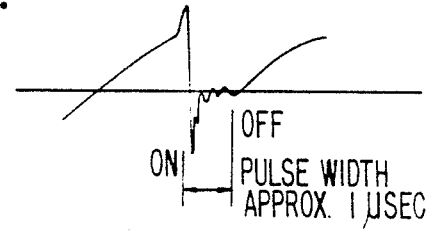
FIG. 4a is a graph showing the turn-on time of the semi-conductor switching device of the present invention, wherein the ordinate represents voltage and the abscissa represents time.
Figure 4B:
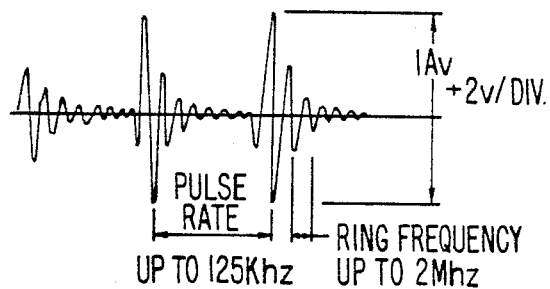
FIG. 4b is a graph depicting the voltage across the motor during start-up conditions, wherein the ordinate represents voltage and the abscissa represents time.
Figure 4C:
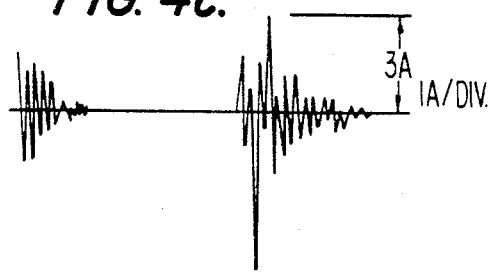
FIG. 4c is a graph depicting the current passing through the motor windings, wherein the ordinate represents current and the abscissa represents time.
Figure 4D:
FIG. 4d is a graph depicting average current through the motor windings, wherein the ordinate represents current and the abscissa represents time.

With reference to FIGS. 4a–4d, the operation of the system will be described in greater detail. First, it should be realized that the internal capacitance of motor 24 together with the motor coil form a tank circuit. FIG. 4a shows the switching action of transistor 70. The entire cycle time of the transistor can be as low as approximately 8 microseconds producing a frequency up to 125 kHz. The sharp face of the curve at "turn-on" of the transistor results in a very fast voltage rise at the pump motor. The width of the pulse produced in the example of FIG. 4a is approximately 1 microsecond. FIG. 4b shows the voltage across the motor produced as a result of the pulse. Initially, this voltage is relatively high, on the order of 1.4 volts. Since motor 24 is an inductive load, the voltage across the load decays. Due to the tank circuit of the motor, the decaying action appears as a damped sine wave. FIG. 4c shows the current through the motor as a result of a pulse. Since the motor is an inductive load, when voltage is initially supplied, the current is initially zero. The current then rises. Due to the tank circuit action, the current oscillates as it rises until it reaches a peak of 3–4 amps. FIG. 4d shows that the average current builds during the pulse but is small compared to the peak current in the tank circuit.

Essentially, at low insolation levels, the comparator 48, transistor 70 and photovoltaic panel 26 together with the load combination act as a relaxation oscillator with the motor inductance as one of the timing elements. Since comparators and MOSFET transistors operate at very high frequencies and motor inductances are not usually high, the resultant switching rate can be very high, on the order of 125 kHz. The motor responds to this very quick pulse by "ringing" at an even higher frequency, around 2 kHz. The current to the motor oscillates also, but building during the pulse rather than decaying as the voltage does. The motor pump winding, along with the capacitance of the motor form a resonant tank circuit. This tank circuit is pumped by the series of pulses from the transistor 70. Tank circuits can store power at their resonant frequencies when they are being "pumped." The storage is temporary, but as insolation to the panel 26 increases, the amplitude and duration of the pulses increase to the point where the motor is "jiggled" into rotation. Thus, the frequency of the pulses decreases as the available power increases. Once sufficient motor speed is reached to produce enough counter EMF, the comparator circuit stays "on" and no longer oscillates. If the voltage of panel 26 falls below the predetermined value, the comparator circuits will oscillate, thus effectively stopping the motor at virtually the same power level it started out.

Thus it can be seen that by "jiggling" the motor with pulses from panel 26, the motor can be started at an earlier time than if the insolation to panel 26 must be sufficient to produce sufficient output power to start the motor running, since this output power level will be greater than is necessary to maintain the motor running. Thus, by "jiggling" the motor, continuous operation of the motor can be achieved as soon as the panel 26 operates on a power curve which is sufficient to maintain motor operation.

LEDs 76 and 80 are illuminated to indicate, respectively, operation of the pump motor 24 and low sun conditions. Capacitor 74 is provided merely to shunt high audio frequencies past motor 24 since these frequencies can cause mechanical oscillations of the motor coils and produce annoying noise. The system operates just as effectively with capacitor 74 eliminated.

As discussed above, resistor 64 provides hysteresis so that the duration of the pulses to motor 24 can be adjusted by changing the value of this resistor.

The foregoing description of the present invention is provided for the purpose of illustrating the invention and is not considered to be limitative thereof. Clearly, numerous additions, substitutions and other modifications can be made without departing from the scope of the invention as set forth in the appended claims.

What is claimed is:

1. A circuit for converting solar energy into electricity for starting and running a load, comprising:
   a photovoltaic panel for converting solar energy into electrical energy output having a voltage and a current;
   a load having an inherent inductance and capacitance, and requiring a starting current which is higher than a minimum running current;
   means for sensing the output of said photovoltaic panel; and
   means responsive to said sensing means for applying said output to said load in pulses at a frequency which varies inversely with the maximum available power from said output thereby pumping said load with a series of said pulses to cause a ringing within said load to initially start said load at a point in time before said current output reaches said starting current.

2. A circuit as claimed in claim 1 wherein said sensing means comprises for applying a resistance higher than said load resistance to said photovoltaic panel to cause said output to be in a high voltage range of a power curve of said photovoltaic panel.

3. A circuit as claimed in claim 2 wherein said means for applying said output to said load comprises control means for comparing said voltage of said output to a predetermined voltage level, and applying substantially all of said voltage across said load when said voltage is above said predetermined level.

4. A circuit as claimed in claim 3 wherein said resistance applying means comprises a resistor connected in series with said load, and said control means comprises a comparator connected to receive said voltage and said predetermined voltage level, and a semi-conductor switching device connected to an output of said comparator, said semi-conductor switching device being connected to selectively short said resistor.

5. A circuit as claimed in claim 1 wherein said applying means includes means for alternating a load impedance across said photovoltaic panel between said load and a second impedance in response to variations in the level of said output detected by said sensing means.

6. A circuit as claimed in claim 5 wherein said alternating means includes a switching element operative at a rate in excess of 1 kHz.

7. A circuit as claimed in claim 6 wherein said switching element is operative at a rate of above approximately 100 kHz.

8. A circuit as claimed in claim 1 wherein said load is a motor.

9. A circuit as claimed in claim 8 in combination with a solar collector and a pump for circulating a heat exchange fluid through said solar collector, said motor being operatively connected to drive said pump.

10. A circuit for starting and operating a load using power derived exclusively from a photovoltaic panel, comprising:
    a first load to be operated;
    a second load;
    a photovoltaic panel having a power output curve demonstrating a high voltage, low current output under high load conditions and a low voltage, high current output under low load conditions, and wherein the total power available from said panel increases with an increase of solar insolation; and
    circuit means for detecting an output parameter of said panel to determine a shift in said panel output in a first direction along said curve and effecting a change in the load on said panel between said first load and said second load in response to detecting said shift to cause a shift in an opposite direction along said curve, thereby producing pulses of power through said first load, said parameter being one of instantaneous output voltage, instantaneous output current, and instantaneous output power.

11. A circuit as claimed in claim 10 wherein said first load is a motor.

12. A circuit as claimed in claim 11 in combination with a solar collector, a storage tank, a pump for pumping fluid between said storage tank and said solar collector, wherein said pump is driven by said motor.

13. A method for starting and operating a load using power derived exclusively from a photovoltaic panel having a power output curve demonstrating a high voltage, low current output under high load conditions and a low voltage, high current output under low load conditions, and wherein the total power available from said panel increases with an increase of solar insolation, said method comprising:
    detecting an output parameter of said panel to determine a shift in said panel output in a first direction along said curve,
    effecting a change in the load impedance on said panel between a first load to be operated and a second load which has an impedance different than said first load in response to detecting said shift to cause a shift in an opposite direction along said curve, and causing said shifts at a proper timing to produce pulses of power to said first load,
    said parameter being one of instantaneous output voltage, instantaneous output current, and instantaneous output power.

14. A circuit for converting solar energy into electricity for starting and running a load, comprising:
    a photovoltaic panel for converting solar energy into electrical energy output having a voltage and a current;

a load requiring a starting current which is higher than a minimum running current;

means for sensing the output of said photovoltaic panel; and means responsive to said sensing means for applying said output to said load in pulses at a frequency which varies inversely with the maximum available power from said output;

wherein said sensing means comprises means for applying a resistance higher than said load resistance to said photovoltaic panel to cause said output to be in a high voltage range of a power curve of said photovoltaic panel, said applying means comprising control means for comparing said voltage of said output to a predetermined voltage level, and applying substantially all of said voltage across said load when said voltage is above said predetermined level, and a resistor connected in series with said load, said control means comprising a comparator connected to receive said voltage and said predetermined voltage level, and a semi-conductor switching device connected to an output of said comparator, said semi-conductor switching device being connected to selectively short said resistor.

* * * * *